US008709179B2

(12) United States Patent
Hoffman et al.

(10) Patent No.: US 8,709,179 B2
(45) Date of Patent: Apr. 29, 2014

(54) SUPPRESSING TIN WHISKER GROWTH IN LEAD-FREE SOLDERS AND PLATINGS

(75) Inventors: Elizabeth N Hoffman, Aiken, SC (US); Poh-Sang Lam, Martinez, GA (US)

(73) Assignee: Savannah River Nuclear Solutions, LLC, Aiken, SC (US)

(*) Notice: Subject to any disclaimer, the term of this patent is extended or adjusted under 35 U.S.C. 154(b) by 273 days.

(21) Appl. No.: 13/269,803

(22) Filed: Oct. 10, 2011

(65) Prior Publication Data
US 2013/0089181 A1    Apr. 11, 2013

(51) Int. Cl.
*C22F 3/00* (2006.01)
(52) U.S. Cl.
CPC .................................... *C22F 3/00* (2013.01)
USPC ..................... 148/525; 148/565; 250/492.1

(58) Field of Classification Search
None
See application file for complete search history.

(56) References Cited

U.S. PATENT DOCUMENTS

2005/0145502 A1* 7/2005 Schetty et al. ............. 205/253
2007/0117475 A1* 5/2007 Tu ............................... 439/884

OTHER PUBLICATIONS

M. Osterman, Mitigation Strategies for Tin Whiskers; CALC Consotium (University of California); 11 pages; Jul. 23, 2002-Aug. 28, 2002.
W.J. Boettinger, C.E. Johnson, L.A. Bendersky, K.-W. Moon, M.E. Williams, G.R. Stafford; Whisker and Hillock formation of Sn, Sn—Cu and Sn—pB electroposits; www.sciencedirect.com, Elsevier Ltd. of Acta Materialia, Inc. 53 (2005) 5033-5050.
K.N. TUa, J.C.M. Lib; Spontaneous whisker growth on lead-free solder finishes; 2005 Elsevier BV Material Science & Engineering, A 409 (2005) 131-139.
Brusse JA, Ewell GJ, Siplon JP; Tin Whiskers: Attributes and Mitigation, $22^{nd}$ Capacitor and Resistor Technology Symposium Proceedings, Mar. 2002; pp. 67-80.

* cited by examiner

*Primary Examiner* — George Wyszomierski
(74) *Attorney, Agent, or Firm* — J. Bennett Mullinax, LLC (57) ABSTRACT

A process of irradiation Sn containing Pb-free solder to mitigate whisker formation and growth thereon is provided. The use of gamma radiation such as cobalt-60 has been applied to a substrate of Sn on copper has been found to change the morphology of the crystalline whisker growth to a more truncated hillock pattern. The change in morphology greatly reduces the tendency of whiskers to contribute to electrical short-circuits being used as a Pb-free solder system on a copper substrate.

7 Claims, 10 Drawing Sheets

SUPPRESSING TIN WHISKER GROWTH IN LEAD-FREE SOLDERS AND PLATINGS

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards a process and a resulting product for preventing metallic tin whisker growth in Pb-free solders and platings.

BACKGROUND OF THE INVENTION

The use of Pb-free solders on Cu conductors have become widely adopted in various electronic components including consumer electronic products, aviation electronics, computers, military weapons, communication devices, satellites, and aerospace electronic components. The formation of whisker growth on Sn solders has become a serious reliability issue. The Sn whisker growth can extend to several hundred microns in length which can create electrical shorts between adjacent solder legs on a conductive device. Long term reliability of Pb-free solders on Cu conductors is essential. Heretofore, there has been no solution to the whisker growth problem within Pb-free solders.

Accordingly, there remains room for improvement and variation within the art.

SUMMARY OF THE INVENTION

It is an aspect of at least one of the present invention to provide for a process of reducing whisker formation on Pb-free solders by exposing the solder to a gamma irradiation.

It is a further aspect of at least one embodiment of the invention to provide for a process of controlling Sn whisker growth and Pb-free solders by altering the form of metallic crystal growth within the Sn film from whiskers to one of a hillock formation.

It is a further aspect of at least one embodiment of the present invention to provide for a process of preventing Sn whisker growth on a Pb-free solder which does not require the application of additional coatings or protective layers applied to an electronic component.

It is then a further aspect of at least one embodiment of the present invention to provide for a process of irradiating Pb-free solders in which the gamma source is cobalt-60.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIGS. 1 and 2 are standing electron micrographs showing whisker formation in the presence of Sn thin films electrodeposited onto a copper substrate.

FIGS. 3 and 4 are Sn thin films electrodeposited onto a Cu substrate exposed to a high gamma radiation Co-60 source.

FIGS. 5 and 6 are scanning electron micrograph of Sn thin films electrodeposited onto a Cu substrate and exposed to a low gamma radiation source.

FIG. 7 is an energy dispersive spectroscopy (EDS) spectrum of a low gamma radiation treated Sn coating indicating formation of a copper oxide.

FIGS. 8-10 are x-ray diffraction (XRD) data from respective controls, high gamma, and low gamma samples indicating an additional compound of Pouaite being present on gamma irradiated samples.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

The present invention is directed to a process of alleviation the spontaneous growth of tin whiskers which occurs in Sn-containing lead-free solders and platings. To evaluate the various whisker formation alleviation processes, Sn was electrodeposited onto a copper substrate to provide a simulated Pb-free solder sample. As seen in reference to FIGS. 1 and 2, control samples of tin deposited on a copper substrate show the formation of characteristic tin whiskers. Formation of whisker growth on lead-free solder finishes is well documented. The whisker growth phenomenon is described in the article "Spontaneous Whisker Growth on Lead-Free Solder Finishes" published in *Materials Science and Engineering A* 409 (2005) 1131-1139 by K. N. Tu and J. C. M. Li and which is incorporated herein by reference.

The formation of whiskers is undesired since the whiskers can interact with adjacent solders or other conductive electrical components to create a short-circuit end device failure. Conventional whisker mitigation of using coatings introduces additional problems. Issues of material selection, material compatibility, and greater weight from the coatings require additional manufacturing and process control efforts.

In the course of the present invention, it has been found that supplying a gamma irradiation source to the Sn and copper substrate modifies the interfacial residual stress associated with whisker formation and changes the metallic crystal growth mechanism from elongated whiskers to a much shorter hillock formation.

Figure 1:
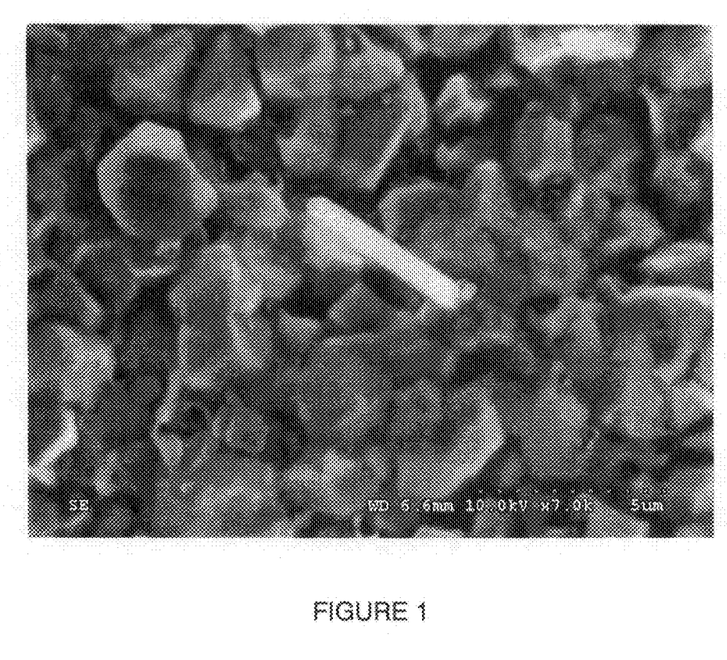
Figure 2:
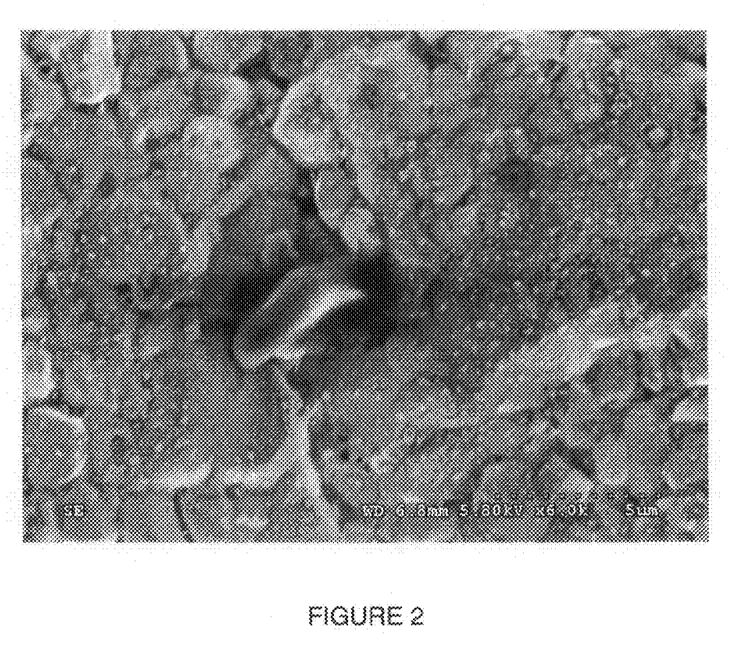
Figure 3:
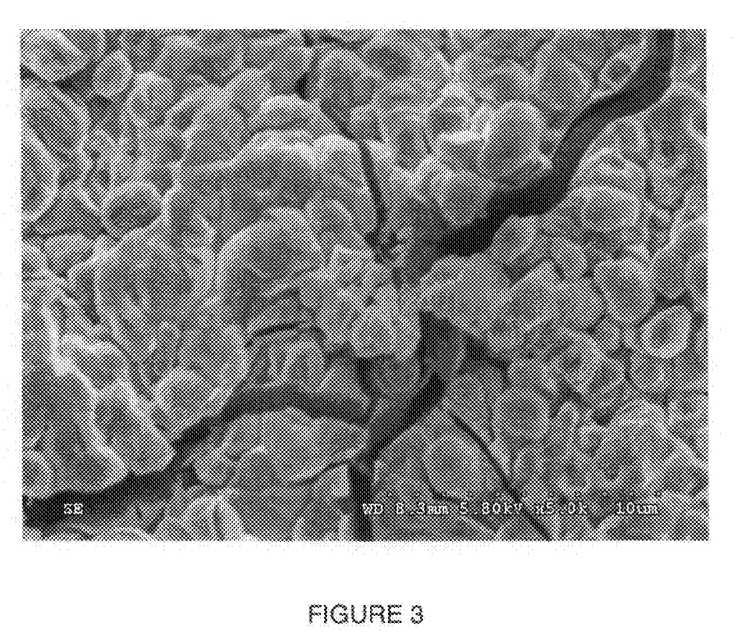
Figure 4:
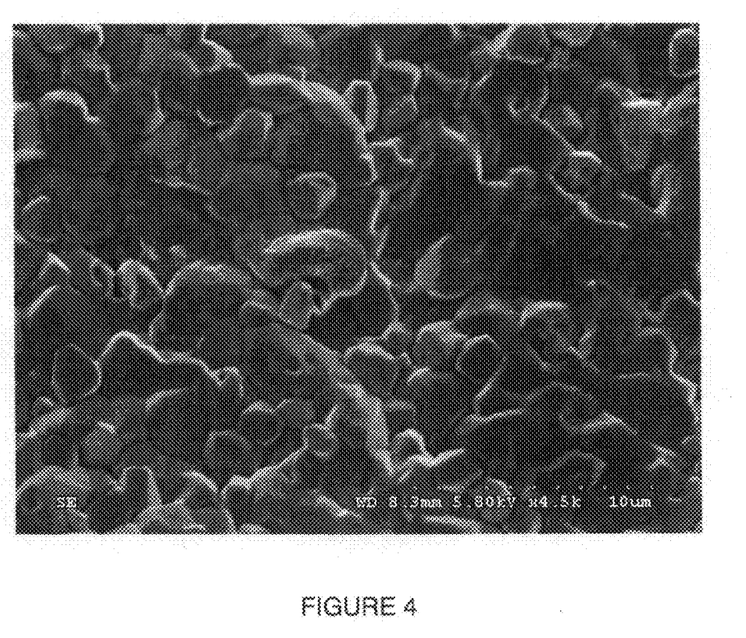

It is best seen in reference FIGS. 3-4, a high gamma radiation cobalt-60 source was used to irradiate the sample. This Cobalt-60 source was estimated to generate an average dose rate of about $2.77 \times 10^5$ Rad per hour upon the sample, and the total exposure time for this sample was 2607 hours (108.6 days) for a total exposure was $7.22 \times 10^8$ Rad (Radiation Absorbed Dose). It has been shown that following a 20-day exposure with the same type of specimens (Sn film on Cu), no whisker growth was observed. As seen in FIGS. 3 and 4, characteristic rounded hillock formations result over time instead of the formation of whiskers. The change in morphology from whiskers to hillocks is important in that the elongated whisker growth is curtailed and there is less opportunity for hillock metallic crystals to achieve a length or morphology that may create a short-circuit within an electrical component.

Figure 5:
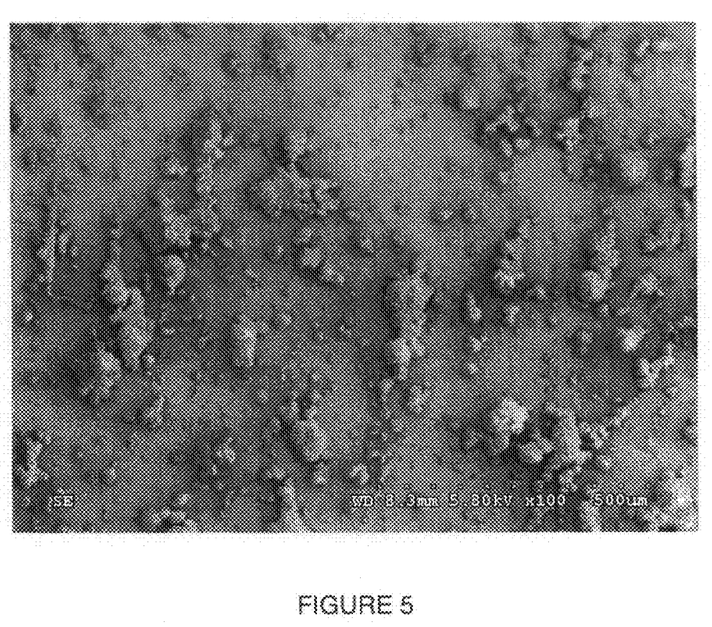
Figure 6:
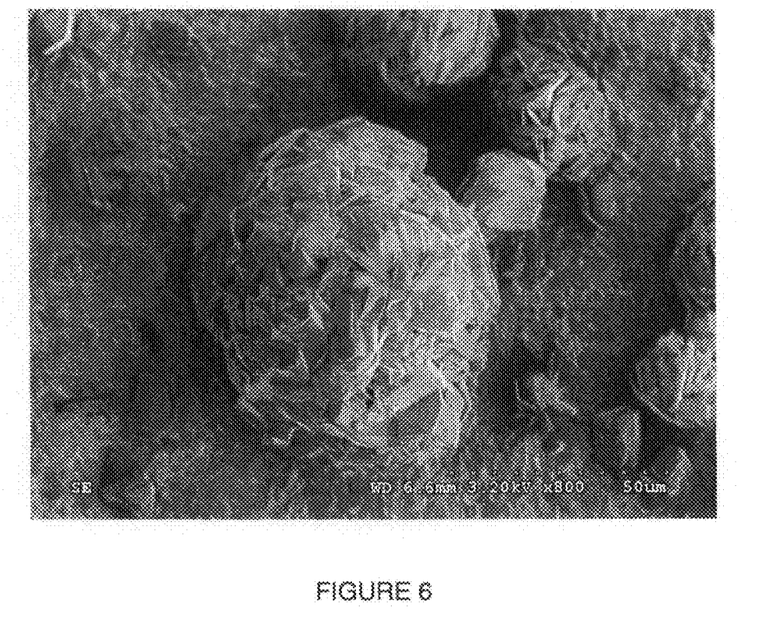

As seen in reference to FIGS. 5 and 6, use of a lower intensity of gamma radiation also results in a change of crystal morphology from whiskers to a hillock formation. This Cobalt-60 source generated a dose rate of approximately $1.87 \times 10^5$ Rad per hour upon the sample and the sample was exposed for 2752 hours (114.7 days). The total dose received by the sample was estimated as $5.15 \times 10^8$ Rad. It is noted that the lower radiation flux does seem to affect the size and distribution of hillocks, though such hillocks are also believed less prone to electrical short-circuit problems attributable to whisker formation.

Figure 7:
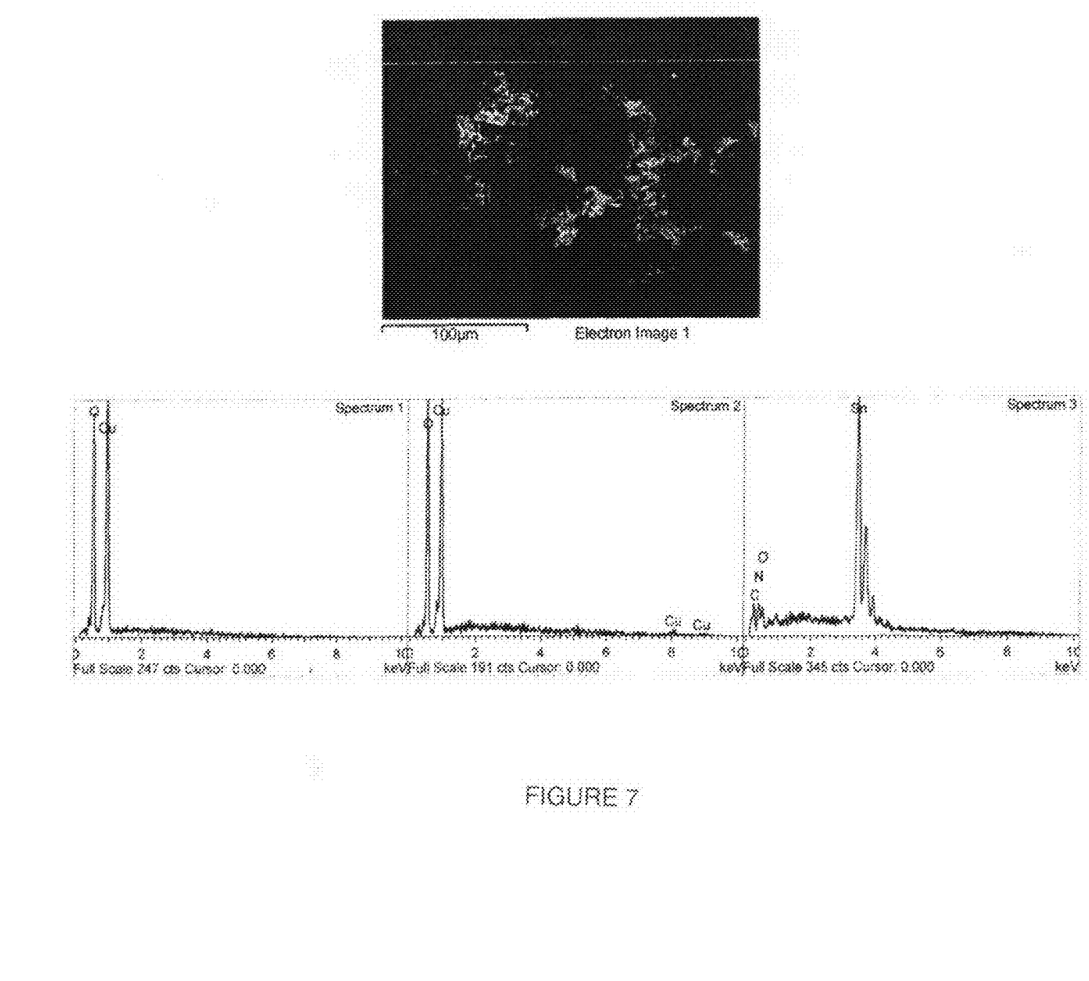

As set forth in FIG. 7, a spectrum of an EDS sample of low gamma radiation is set forth. The EDS data indicates copper and oxygen are present in the Sn coating. Without being limited by theory, Applicant notes that the formation of a copper oxide on the Sn coating may be functionally related to the change in crystal growth morphology from whiskers to hillock morphology. However, the relationship between the coating and tin whisker growth may not have the functional relationship to the presence of the coating. However, it is envisioned that the formation of the coating may be one way of monitoring that a successful amount and/or interval of gamma radiation has been applied.

Figure 8:
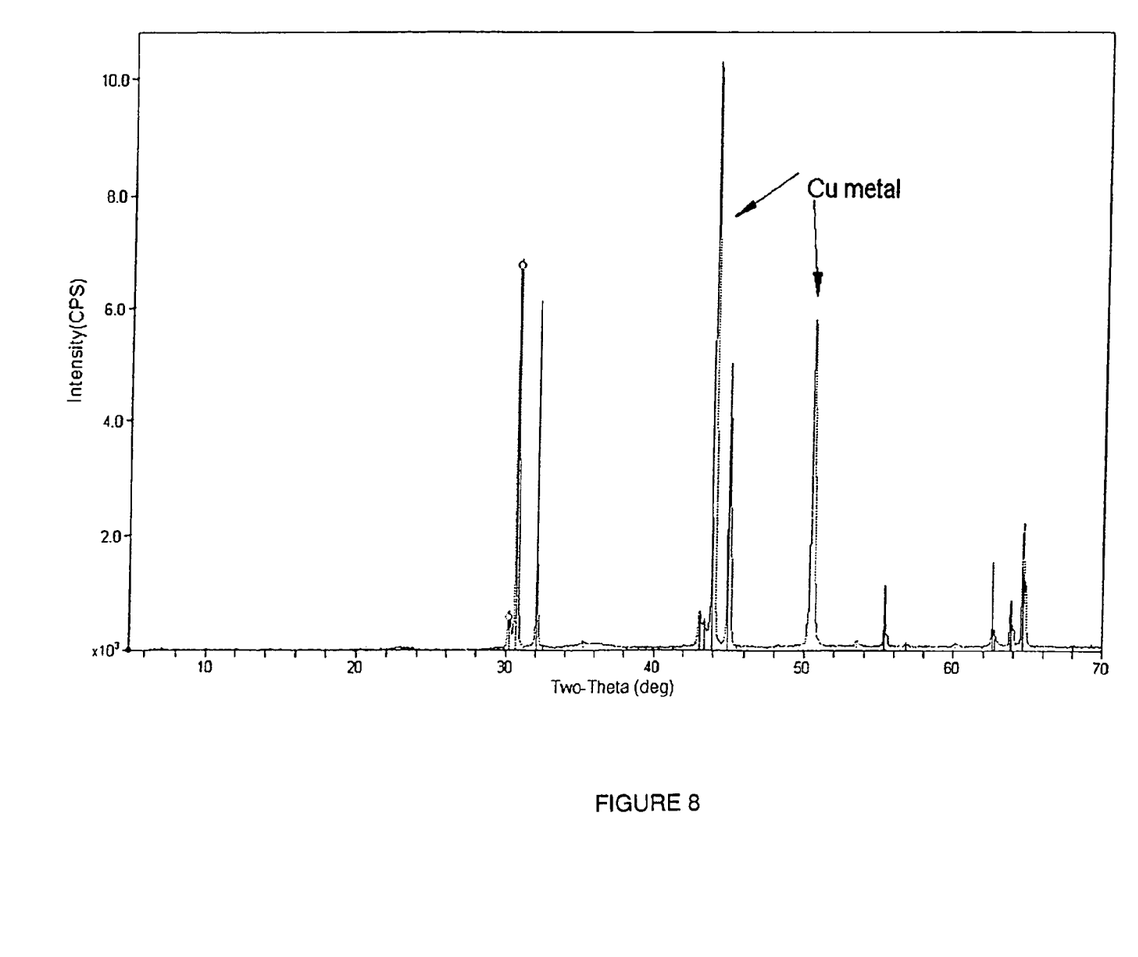
Figure 9:
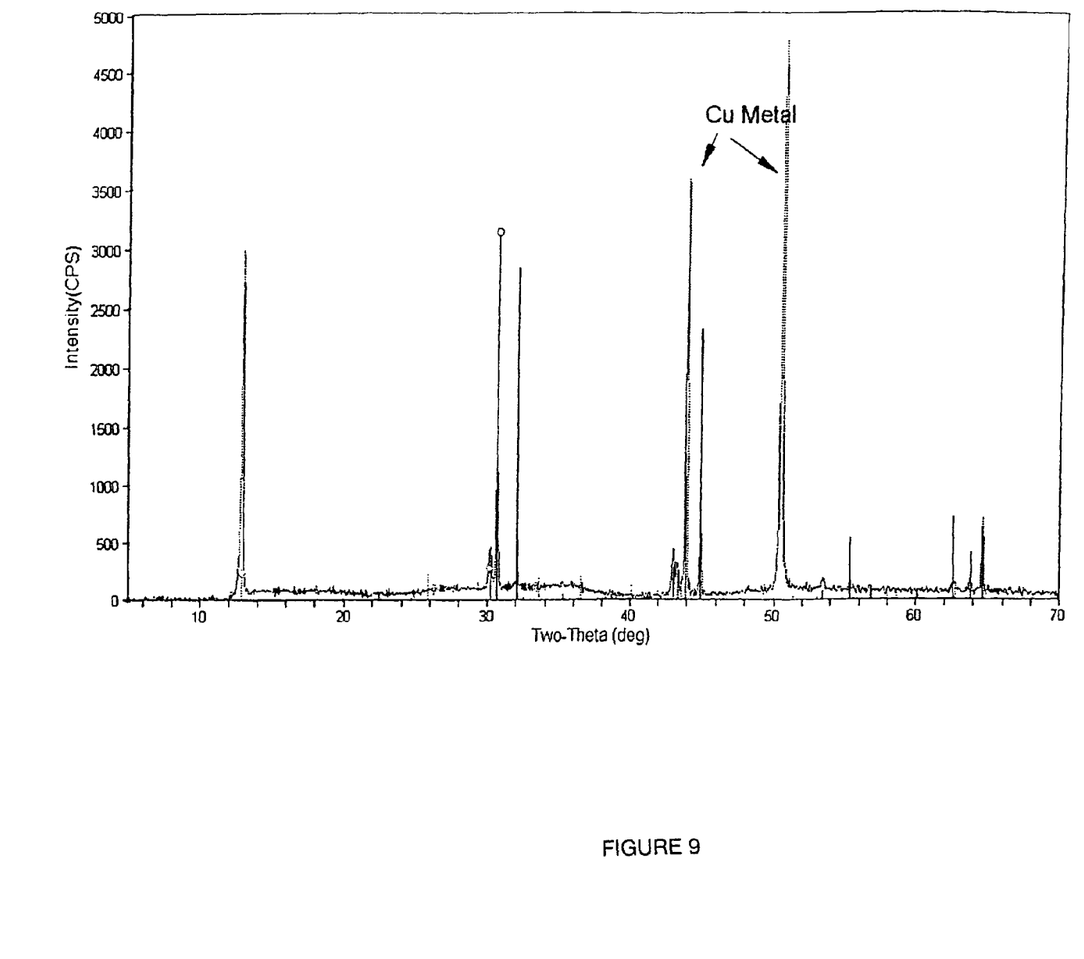
Figure 10:
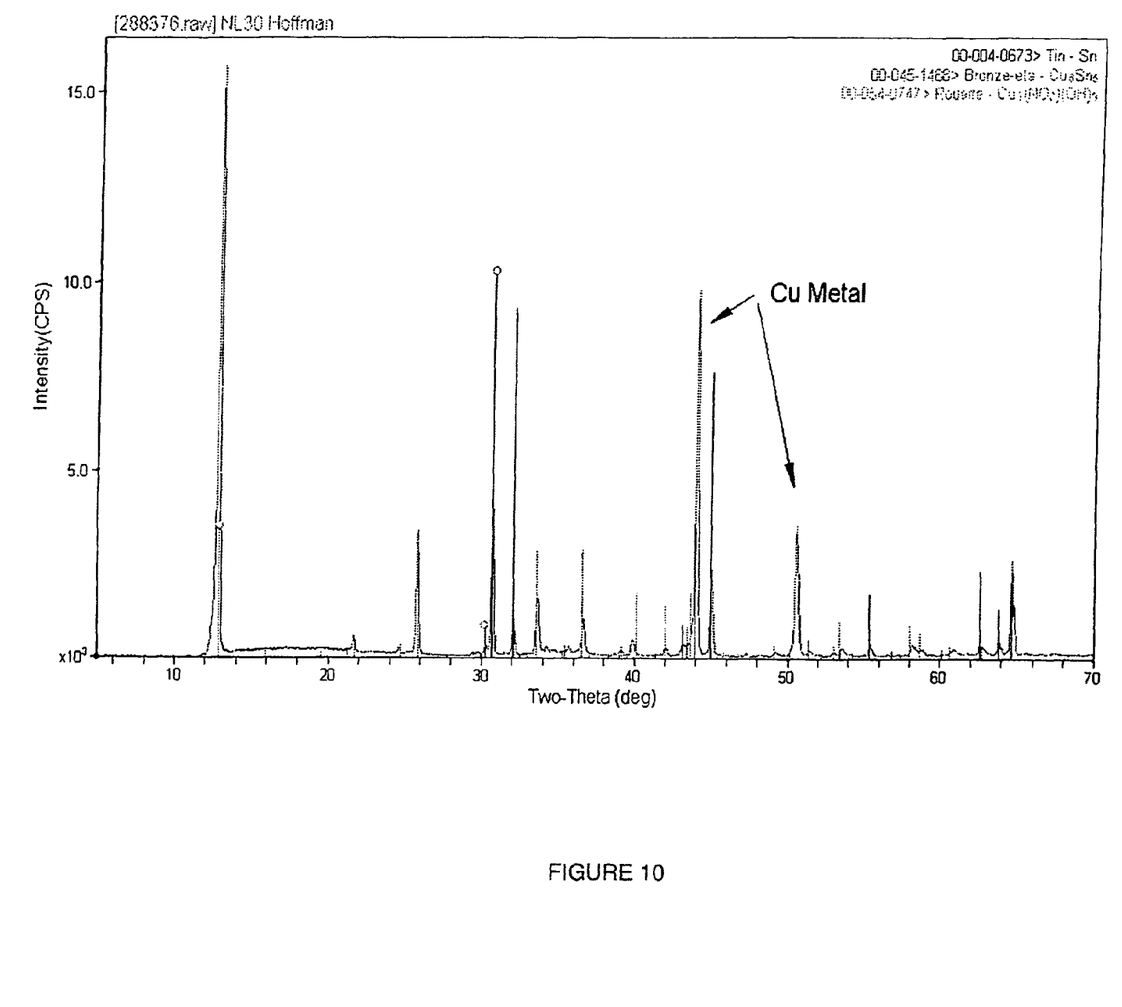

FIGS. 8-10 set forth X-ray diffraction data of a control Sn thin film electrodeposited onto a Cu substrate (FIG. 8) in comparison to similar films subjected to high gamma radiation (FIG. 9) and low gamma radiation (FIG. 10). Whisker growth only occurred in the film irradiated sample XRD analysis showed only Cu and Sn being present in the Figure's control sample. For the two gamma irradiated samples, XRD analysis showed that the compound Rouaite $Cu_2NO_3(OH)_3$ was formed. The formation of the Rouaite is believed to be due to the radiolysis of nitrogen gas and the amount of Rouaite is greater under low flux conditions than high radiation flux conditions. The relationship between the Rouaite and Sn whisker suppression may be a non-functional artifact. If so, the presence of the Rouaite may still be useful in correlating that an effective amount of gamma radiation has been applied to the Sn solder.

While the above examples are directed to the use of Pb-free solders on Cu substrates, other substrates besides copper are believed to be operative with the present invention. Suitable substrates include alloy 42 (nickel, iron alloy) and other similar substrates having utility for use as a substrate in soldering for electronic components.

Accordingly, the formation of Rouaite would be specific for a copper-based substrate. It is believed that on other substrates, other metal nitrates would be formed due to the radiolysis of air in which nitrogen serves as a source to create a nitrate on the substrate. Such nitrates may have a function in suppressing whisker growth on Pb-free solder and/or have utility for detecting that an effective amount of the radiation has been applied to the solder as well as providing a post production assay of evaluating whether a solder containing electronic component had been treated with gamma radiation.

As set forth in the examples above, the total radiation absorbed dose of $7.22 \times 10^8$ and $5.15 \times 10^8$ were effective in suppressing whisker growth in the Pb-free solder. It is believed an effective amount of gamma radiation needed to suppress whisker growth can be determined by a routine experimentation that may well involve lesser doses of radiation and shorter exposure times. It is further envisioned that the effective dose can be correlated by the formation of various oxides or nitrates which are associated with the gamma radiation.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A process of treating a lead-free, Sn-based solder or plating comprising the steps of:
   subjecting said solder or plating to an effective amount of gamma radiation so as to form an altered crystalline formation on a surface of the Sn so as to prevent the formation of whiskers.

2. The process according to claim 1 wherein said Sn-based solder or plating is on a Cu substrate.

3. The process according to claim 2, wherein a surface of the Sn-based solder or plating has a coating of Cu oxide.

4. The process according to claim 2, wherein the Sn-based solder or plating has a surface coating of a Rouaite.

5. The process according to claim 1 wherein said altered crystalline formation is in the form of hillock structures.

6. A process of treating Sn containing lead-free solder or plating on a copper substrate comprising the steps of exposing the Sn solder or plating to a gamma radiation source for a time interval sufficient for the formation of a Rouaite coating on a surface of the Sn, wherein said Rouaite is resistant to the formation of whiskers.

7. A process of treating a lead free, Sn-based solder or plating on a substrate comprising the steps of:
   subjecting said solder or plating to an effective amount of gamma radiation so as to form a coating of metal nitrate upon a surface of the Sn solder or plating.

* * * * *